US 7,991,647 B2

(12) United States Patent
Lutnick et al.

(10) Patent No.: US 7,991,647 B2
(45) Date of Patent: Aug. 2, 2011

(54) SYSTEMS AND METHODS FOR PROVIDING VOLUME-WEIGHTED AVERAGE PRICE AUCTION TRADING

(75) Inventors: Howard W. Lutnick, New York, NY (US); Glenn D. Kirwin, Scarsdale, NY (US); Joan Kirwin, legal representative, Scarsdale, NY (US); Timothy D. Jones, Cedar Knolls, NJ (US)

(73) Assignee: BGC Partners, Inc., New York, NY (US)

( * ) Notice: Subject to any disclaimer, the term of this patent is extended or adjusted under 35 U.S.C. 154(b) by 0 days.

(21) Appl. No.: 12/436,940

(22) Filed: May 7, 2009

(65) Prior Publication Data
US 2010/0030655 A1    Feb. 4, 2010

Related U.S. Application Data

(63) Continuation of application No. 10/678,582, filed on Oct. 2, 2003, now Pat. No. 7,548,876.

(60) Provisional application No. 60/415,843, filed on Oct. 2, 2002.

(51) Int. Cl.
*G06Q 30/00* (2010.01)

(52) U.S. Cl. ............... 705/26.3; 705/26.1; 705/26.2; 705/27.1; 705/37

(58) Field of Classification Search ............... 705/26, 705/27, 37
See application file for complete search history.

(56) References Cited

U.S. PATENT DOCUMENTS

| 4,980,826 | A | * | 12/1990 | Wagner | 705/37 |
| 5,845,266 | A | | 12/1998 | Lupien et al. | |
| 6,098,051 | A | | 8/2000 | Lupien et al. | |
| 6,912,511 | B1 | | 6/2005 | Eliezer et al. | |
| 6,996,539 | B1 | | 2/2006 | Wallman | |
| 7,110,974 | B1 | | 9/2006 | Rust | |
| 7,299,208 | B1 | | 11/2007 | Bailon et al. | |
| 7,469,229 | B2 | | 12/2008 | Romani | |
| 2001/0034696 | A1 | | 10/2001 | McIntyre | |
| 2001/0037284 | A1 | | 11/2001 | Finkelstein et al. | |
| 2001/0044767 | A1 | | 11/2001 | Madoff et al. | |
| 2002/0019795 | A1 | | 2/2002 | Madoff et al. | |
| 2002/0052827 | A1 | | 5/2002 | Waelbroeck et al. | |
| 2002/0091617 | A1 | | 7/2002 | Keith | |

(Continued)

FOREIGN PATENT DOCUMENTS

WO    01/84419    11/2001

(Continued)

OTHER PUBLICATIONS

"Experimental Markets for Product Concepts" by Nicholas T. Chan, Ely Dahan, Andrew W. Lo, and Tomaso Poggio. Jul. 2001. Retrieved at ,http://citeseerx.ist.psu.edu>.*

(Continued)

*Primary Examiner* — Michael A. Misiaszek

(57) ABSTRACT

Systems and methods for providing traders with an opportunity to trade on the VWAP price are provided. After a trader enters a VWAP auction session, the trader has a predetermined about of time (i.e., the length of the VWAP auction period) to place bids and/or offers on an item. When the VWAP auction period ends, the electronic trading application matches the VWAP orders. The VWAP orders that are not matched are cancelled. The electronic trading application collects trading information (e.g., price, size, etc.) corresponding to the received orders. The collected information is processed to determine the VWAP price. The VWAP price is presented to the trader and the matched VWAP orders are filled based on the determined VWAP price.

20 Claims, 6 Drawing Sheets

U.S. PATENT DOCUMENTS

| | | | |
|---|---|---|---|
| 2002/0111896 A1 | 8/2002 | Ben-Levy et al. | |
| 2002/0156719 A1 | 10/2002 | Finebaum et al. | |
| 2002/0174060 A1 | 11/2002 | Friedland et al. | |
| 2002/0194107 A1* | 12/2002 | Li et al. .......................... | 705/37 |
| 2003/0004852 A1 | 1/2003 | Burns | |
| 2003/0004853 A1 | 1/2003 | Ram et al. | |
| 2003/0014354 A1 | 1/2003 | Madoff et al. | |
| 2003/0177126 A1 | 9/2003 | Weingard et al. | |
| 2003/0225673 A1* | 12/2003 | Hughes et al. ................. | 705/37 |
| 2004/0236614 A1* | 11/2004 | Keith .............................. | 705/4 |
| 2004/0236636 A1 | 11/2004 | Lutnick et al. | |
| 2005/0149426 A1 | 7/2005 | Jokisch et al. | |

FOREIGN PATENT DOCUMENTS

WO          03/036540          5/2003

OTHER PUBLICATIONS

U.S. PTO Office Action for U.S. Appl. No. 10/678,582; Aug. 5, 2008.

"POSIT®," printed from www.equitystation.com on Jan. 30, 2003 (1 page).

"A Powerful New Option for POSIT® Users," printed from www.itginc.com on Jan. 30, 2003 (4 pages).

"POSIT 4 in action," printed from www.itginc.com on Jan. 30, 2003 (2 pages).

"POSIT®—How POSIT works," printed from www.itginc.com on Mar. 20, 2003 (2 pages).

"What you may not know about POSIT®," printed from www.itginc.com on Jan. 30, 2003 (2 pages).

"POSIT®, Where Risk control meets cost control," printed from www.iginc.com on Jul. 7, 2004 (2 pages).

"POSIT® After Hours—Bringing Superior Portfolio Controls to After Hours Trading," printed from www.itginc.com on Jul. 7, 2004 (2 pages).

U.S. PTO Office Action for U.S. Appl. No. 10/397,109; 13 pages; Dec. 28, 2007.

U.S. PTO Office Action for U.S. Appl. No. 10/397,109; 12 pages; Oct. 16, 2008.

European Office Action for European Application No. 04256362.7; 5 pages; Sep. 5, 2008.

The Primes Auction, http://www.primextrading.com, available through Internet Archive Wayback Machine at http://web.archive.org/web/20021013043720/www.primetrading.com/introduction/two-steps/, as archived on Sep. 28, 2002 and Oct. 13, 2002, respectively.

Pending U.S. Appl. No. 10/678,582; 41 pages; Oct. 2, 2003.

Pending U.S. Appl. No. 10/397,109; 40 pages; filed Mar. 24, 2003.

U.S. PTO Office Action for U.S. Appl. No. 10/397,109; 12 pages; 2/9/9.

U.S. PTO Office Action for U.S. Appl. No. 10/966,526; 6 pages; 1/6/9.

United States Patent and Trademark Office: Office Action for U.S. Appl. No. 10/678,582 in the name of Howard Lutnick, et. al.; 11 pages; Jul. 7, 2006.

*United States Patent and Trademark Office: Office Action* for U.S. Appl. No. 10/678,582 in the name of Howard Lutnick, et. al.; 23 pages; Aug. 23, 2007.

United States Patent and Trademark Office: Office Action for U.S. Appl. No. 10/678,582 in the name of Howard Lutnick, et. al.; 13 pages; Feb. 20, 2007.

*United States Patent and Trademark Office*: Office Action for U.S. Appl. No. 10/678,582 in the name of Howard Lutnick, et. al.; 20 pages; Apr. 17, 2008.

United States Patent and Trademark Office; Office Action for U.S. Appl. No. 10/966,526 filed Oct. 15, 2004, in the name of Phillipp T. Jokisch; 14 pages, Apr. 14, 2008.

Notice of Allowance for U.S. Appl. No. 10/966,526; 8 pages; Mar. 17, 2009.

Notice of Allowance for U.S. Appl. No. 10/678,582; 9 pages; Apr. 16, 2009.

"Experimental Markets for Product Concepts" by Nicholas T. Chan, Ely Dahan, Andrew W. Lo, and Thomas Poggio. Jul. 2001. retrieved at <http://hdl.handle.net/1721.1/7233>.

Pending U.S. Appl. No. 10/966,526 entitled "Systems and Methods for Providing Enhanced Volume-Weighted Average Price Trading", in the name of Phillipp T. Jokisch et al., filed Oct. 15, 2004.

U.S. PTO Office Action for U.S. Appl. No. 12/412,750; 6 pages; Jun. 11, 2009.

\* cited by examiner

SYSTEMS AND METHODS FOR PROVIDING VOLUME-WEIGHTED AVERAGE PRICE AUCTION TRADING

CROSS-REFERENCE TO RELATED APPLICATIONS

This application is a continuation of U.S. patent application Ser. No. 10/678,582, filed Oct. 2, 2003 now U.S. Pat. No. 7,548,876, which claims the benefit of U.S. provisional application No. 60/415,843, filed Oct. 2, 2002, both of which are hereby incorporated by reference herein in their entirety.

BACKGROUND OF THE INVENTION

The present invention relates to systems and methods for providing auction trading systems, and more particularly to auction trading systems that allow traders to place orders on volume-weighted average price (VWAP) contracts.

Electronically based trading systems have gained widespread popularity over the years. Such trading systems are frequently used for trading items ranging from financial instruments (such as stocks, bonds, currency, futures, contracts, etc.) to used household goods (such as old records, baseball cards, antiques, etc.). In many of these trading systems, bid/offer-hit/lift processes are used to negotiate a sale of a given item. In connection with such processes, bids and/or offers for items are entered into a trading system and a hit or take is submitted in response to a bid or offer, respectively, to agree to a sale, or a purchase.

Historically, traders use benchmarks to evaluate their trades. Determining the volume weighted average price (hereinafter the "VWAP") is one of the most familiar trade evaluation benchmarks. Traders, brokers, institutional investors, and managers determine the quality of their trades by calculating the VWAP and comparing the VWAP to the transactions performed by their respective traders. For example, if a trader purchased a stock today at a price lower than the current cumulative VWAP, the trader bought the stock at a good price—i.e., better than the average buyer of the stock. On the other hand, if the trader bought the stock at a price higher than the VWAP, then the trader overpaid for the stock relative to other buyers of the day. Traders often monitor the VWAP to, for example, predict when short term buying and selling opportunities may arise.

While there are markets that provide trading data such that the VWAP may be calculated, these markets do not provide an opportunity for buyers and sellers to trade on the VWAP. Trading on the VWAP may allow traders to participate in the liquidity of the market.

Therefore, it would be desirable to provide systems and methods that provide traders with an opportunity to trade on the VWAP.

SUMMARY OF THE INVENTION

It is therefore an object of this invention to provide systems and methods that provide traders with an opportunity to trade on the VWAP.

This and other objects are accomplished in accordance with the principles of the present invention by providing systems and methods that enable traders to trade on the VWAP price.

A trader may select from a list of available VWAP auction sessions. In response to selecting an available VWAP auction session, the trader has a predetermined amount of time to place bids and/or offers. The trader is prompted to enter a symbol name (e.g., usg_10Y VWAP) and a size. In some embodiments, a trader may also enter a spread to the calculated VWAP price. In some embodiments, traders may be permitted to place orders that are improvements to the VWAP price.

Traders may continue to place bids and/or offers until the VWAP auction period has ended. Once the electronic trading application has determined that the VWAP auction period has ended, the electronic trading application matches the VWAP orders. VWAP orders may be matched on a first-in-first-out (FIFO). In another suitable approach, VWAP orders may be matched based upon a percentage of the size of the order in relationship to the lesser of the sum of the bid sizes or the sum of the ask sizes (i.e., average size basis). For example, if a first trader and a second trader place bids to each buy 200 30 Year U.S. Treasury bonds and a third trader places an offer to sell 100 30 Year U.S. Treasury bonds, then the first and the second trader will each receive fifty percent of the 100 available bonds. However, the electronic trading application may match the VWAP orders using any other suitable approach, such as, for example, by prioritizing the stack first by best price and then by time of order in order to match VWAP orders.

In response to matching the VWAP orders, the electronic trading application cancels the VWAP orders that are not matched. In some embodiments, VWAP orders that are not matched may be rolled over to another VWAP session on the same item. In other embodiments, a trader may place a recurring VWAP order such that the VWAP order is placed each day for a specific VWAP auction session. The recurring VWAP order may be placed every day until the trader cancels the recurring order.

In response to matching VWAP orders and canceling the unmatched VWAP orders, the electronic trading application may collect size and price (if available) information of the received orders. The electronic trading application processes the collected size and price information to determine the VWAP price. Upon determining the VWAP price, the electronic trading application presents the traders of the VWAP auction session with the determined VWAP price. In response to determining the VWAP price, the electronic trading application fills the matched VWAP orders. The electronic trading application may fill the matched VWAP orders by physical delivery, financial delivery, or any other suitable delivery approach.

In some embodiments, the electronic trading application may use other suitable approaches to determine the VWAP price. For example, the VWAP price may be based on the matched and unmatched VWAP orders. In another example, the VWAP price may be determined for any suitable time period such as on the day of the trade, for multiple days (i.e., multi-day VWAP), or for a particular time period (i.e., intraday VWAP).

In some embodiments, the electronic trading application may enable traders to retrospectively trade on the VWAP. A trader may place a bid to buy a particular item at the VWAP price for a specified period of time. For example, a trader may place an order to pay for his yearly electricity bill (or the quantity of electricity consumed in a year) based on the VWAP price for electricity. The trader may forecast the trader's electricity costs for the next year.

BRIEF DESCRIPTION OF THE DRAWINGS

The above and other objects and advantages of the invention will be apparent upon consideration of the following detailed description, taken in conjunction with accompanying drawings, in which like reference refers to like parts throughout, and in which.

DETAILED DESCRIPTION OF THE INVENTION

Figure 1:
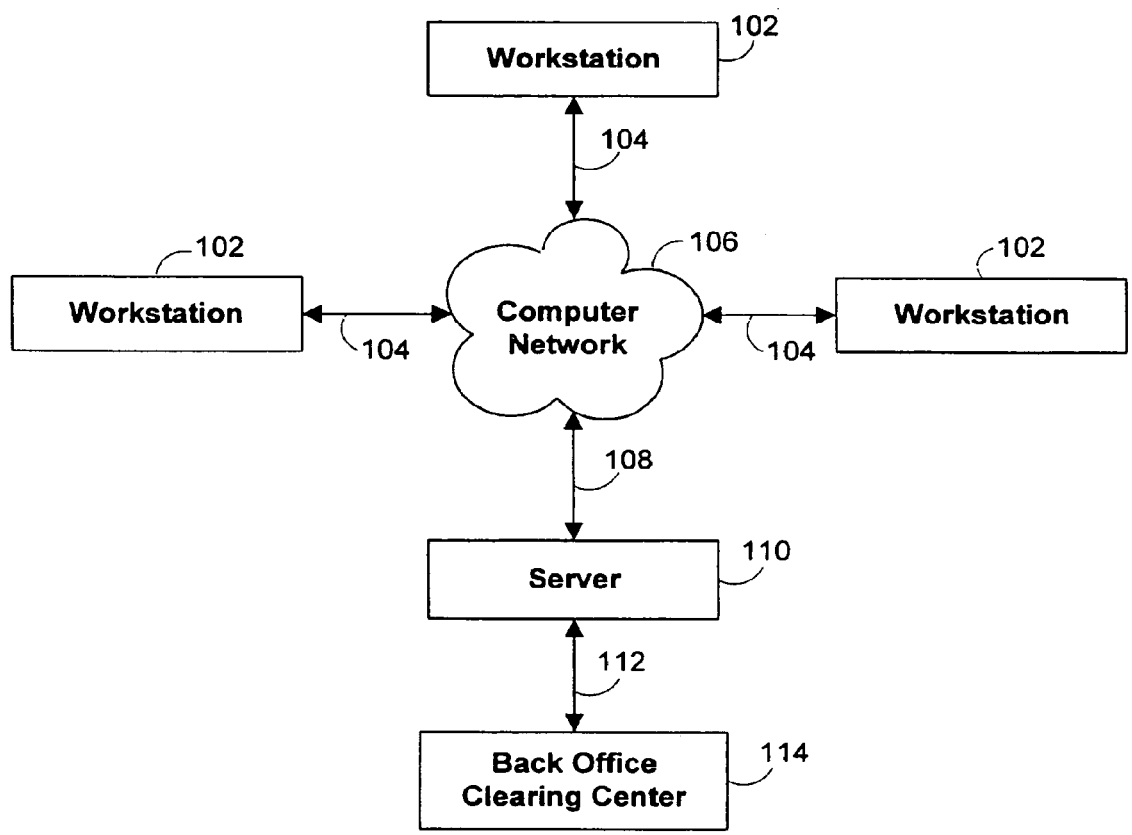
FIG. 1 is a block diagram of a system that may be used to implement processes and functions of certain embodiments of the present invention.

This invention relates to creating systems and methods for providing an auction on items traded at a weighted average price based on the volume of trades done with a specified time period. The following embodiment of the invention relates to the electronic trading of fixed income related instruments—e.g., such as the United States Treasuries, United Kingdom Gilts, European Government Treasuries, and Emerging Market debts, swaps, repos, etc. This invention may also be used for the electronic trading of securities or other financial instruments such as stocks or currencies, and is not limited only to the trading of fixed income related instruments. Nevertheless, this embodiment does not limit the invention to this particular subject matter. Rather, it is provided for illustration of the invention and not to limit it to a particular commodity or market.

It should also be noted that although the following embodiment of the invention relates to the trading of a single instrument, such as United States 30 Year U.S. Treasury bonds, this embodiment is not limited only to the trading of a single instrument. Rather, the invention may also be applied to the trading of a basket of instruments. For example, traders may place offers for VWAP contracts on the net price movements of the current two, five, ten, and thirty year United States Treasury bonds.

A typical trader calculates the volume weighted average price (hereinafter the "VWAP") to evaluate their trade. For example, if a trader purchased a bond today at a price lower than the current cumulative VWAP, the trader bought the bond at a good price—i.e., a price better than the average buyer of the bond. On the other hand, if the trader bought the bond at a price higher than the VWAP, then the trader overpaid for the bond relative to other buyers of the day.

As used herein, the "VWAP" or "VWAP price" is a weighted average price based on the volume of trades done on one or more items within a specified auction time period. When the specified auction time period ends, all trade prices and sizes of an item associated with a VWAP auction are collected. In response to collecting the prices and sizes entered by traders, the VWAP may be calculated using the following algorithm:

$$VWAP = \frac{\sum (\text{Traded Price})(\text{Total Size at that Price})}{\sum \text{Total Size of Trade during Designated Trading Period}}$$

An example of calculating the VWAP for a VWAP auction from collected trade prices and sizes is shown in Table 1. It is worth noting that the illustrative examples which follow focus on bonds and exchanges involving such instruments. Nevertheless, this invention is not limited to the illustrative examples described herein, which are set forth only for purposes of illustration. Rather, this invention is limited only by the claims which are found at the end of this specification.

TABLE 1

| Price | Size | Action | Decimal Price | Decimal Price × Size |
|---|---|---|---|---|
| 100.09 | 35 | Take | 100.28125000 | 3509.843750000 |
| 100.08+ | 60 | Take | 100.26562500 | 6015.937500000 |
| 100.08 | 50 | Take | 100.25000000 | 5012.500000000 |
| 100.07+ | 10 | Hit | 100.23437500 | 1002.343750000 |
| 100.07 | 5 | Hit | 100.21875000 | 501.093750000 |
| 100.062 | 25 | Hit | 100.19531325 | 2504.882831250 |
| 100.06 | 17 | Hit | 100.18750000 | 1703.187500000 |
| 100.052 | 42 | Hit | 100.16406250 | 4206.890625000 |

The Total Size is 244.
Σ(Traded Price) (Total Size at that Price) = 24456.67970625.
The VWAP price for the current 30 Year US Treasury bond is 100.232293878074.

In a preferred embodiment, a trader, such as large block institutional investors, speculators, or market markers, may want to employ systems and methods according to the present invention to trade on the VWAP price. Trading on the VWAP price allows these traders to participate in the liquidity of the marketplace. Trading on the VWAP price may be attractive to large block institutional investors who continually adjust portfolios, speculators who may be seeking arbitrage opportunities, and market makers who are willing to deal on the VWAP price.

It should be noted that the present invention is primarily described herein in terms of an electronic trading application. It will be understood that the electronic trading application may be any suitable, software, hardware, or both configured to implement the features of the present invention. The electronic trading application may be located at a central location (e.g., a central server). In another suitable approach, the electronic trading application may reside among different locations (e.g., a network).

In one particular embodiment, the electronic trading application may include client-side software, hardware, or both. For example, the electronic trading application may encompass one or more Web-pages or Web-page portions (e.g., via any suitable encoding, such as XML, Cold Fusion, etc.).

Although the electronic trading application is described herein as being implemented on user computer equipment, this is only illustrative. The electronic trading application may be implemented on any suitable platform (e.g., personal computer, palmtop computer, laptop computer, personal digital assistant, cellular phone, etc.) to provide such features.

Further details of the invention are described below with respect to FIGS. 1-6.

Referring to FIG. 1, an exemplary system 100 for implementing the present invention is shown. As illustrated, system 100 may include one or more trading workstations 102. Workstations 102 may be local or remote, and are connected by one or more communications links 104 to a computer network 106 that is linked via a communications link 108 to a server 110.

In system 100, server 110 may be any suitable server, processor, computer, or data processing device, or combination of the same. Computer network 106 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 104 and 108 may be any communications links suitable for communicating data between workstations 102 and server 110, such as network links, dial-up links, wireless links, hard-wired links, etc. Workstations 102 enable a trader to engage in the trading process. Workstations 102 may be personal computers, laptop computers, mainframe computers, dumb terminals, data displays, Internet browsers, personal digital assistants (PDAs), two-way pagers, wireless terminals, portable telephones, etc., or any combination of the same.

A back office clearing center 114 may also be connected to server 110 of the trading system via a communications link 112. Clearing center 114 may be any suitable equipment, such as a computer, or combination of the same, for causing trades to be cleared and/or verifying that trades are cleared. If desired, server 110 may contain multiple processors. Communications link 112 may be any communications link suitable for communicating data between server 110 and back office clearing center 114, such as network links, dial-up links, wireless links, hard-wired links, etc.

Figure 2:
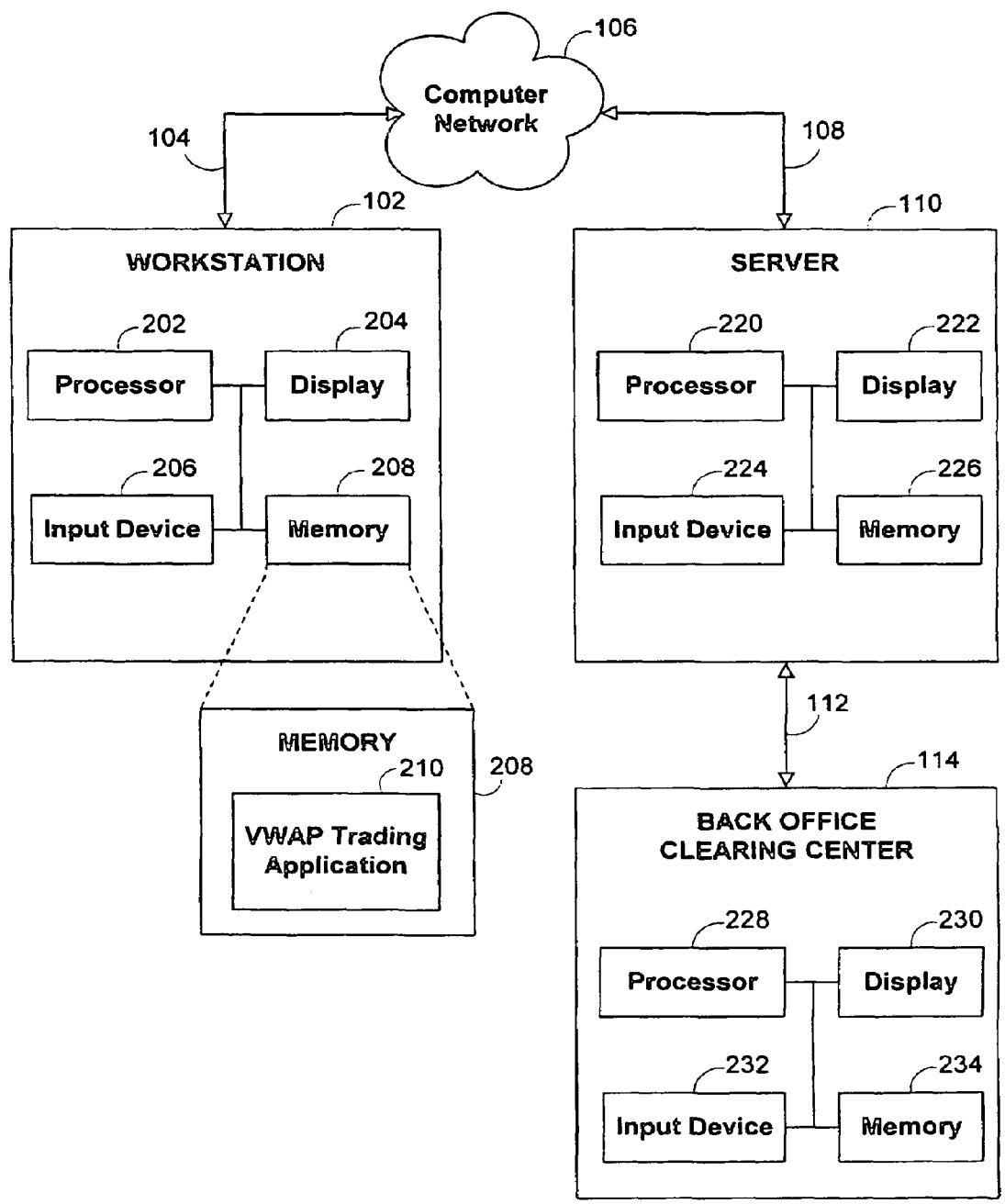
FIG. 2 is a block diagram of a workstation, a server, and a back office clearing center that may be used to implement the processes and functions of certain embodiments of the present invention.

The server, the back office clearing center, and one of the workstations, which are depicted in FIG. 1, are illustrated in more detail in FIG. 2. Referring to FIG. 2, workstation 102 may include processor 202, display 204, input device 206, and memory 208, which may be interconnected. In a preferred embodiment, memory 208 contains a storage device for storing a workstation program for controlling processor 202. Memory 208 also preferably contains a VWAP trading application 210 according to the invention.

VWAP trading application 210 may preferably include an application program interface (not shown), or alternatively, as described above, VWAP trading application 210 may be resident in the memory of server 110. In this embodiment, the electronic trading application may contain VWAP trading application 210 and an application program interface (not shown) as a discrete application from the electronic trading application which also may be included therein. The only distribution to the trader may then be a Graphical User Interface which allows the trader to interact with VWAP trading application 210 resident at server 110.

Processor 202 uses the workstation program to present on display 204 the electronic trading application and trading information relating to market conditions received through communication link 104 and trading commands and values transmitted by a trader of workstation 102. Furthermore, input device 206 may be used to manually enter commands and values in order for these commands and values to be communicated to the electronic trading application.

Server 110 may include processor 220, display 222, input device 224, and memory 226, which may be interconnected. In a preferred embodiment, memory 226 contains a storage device for storing information relating to market conditions received through communication link 108 or through other links, and also receives trading commands and values transmitted by one or more traders. The storage device further contains a server program for controlling processor 220. Processor 220 uses the server program to transact the purchase and sale of the fixed income related instruments.

Back office clearing center 114 may include processor 228, display 230, input device 232, and memory 234, which may be interconnected. In a preferred embodiment, memory 234 contains a storage device for storing a clearing program for controlling processor 228. Processor 228 may use the clearing program to complete the transactions that are entered into by the traders. Processor 228 uses the clearing program to further verify that the transactions are completed and cleared.

Figure 3:
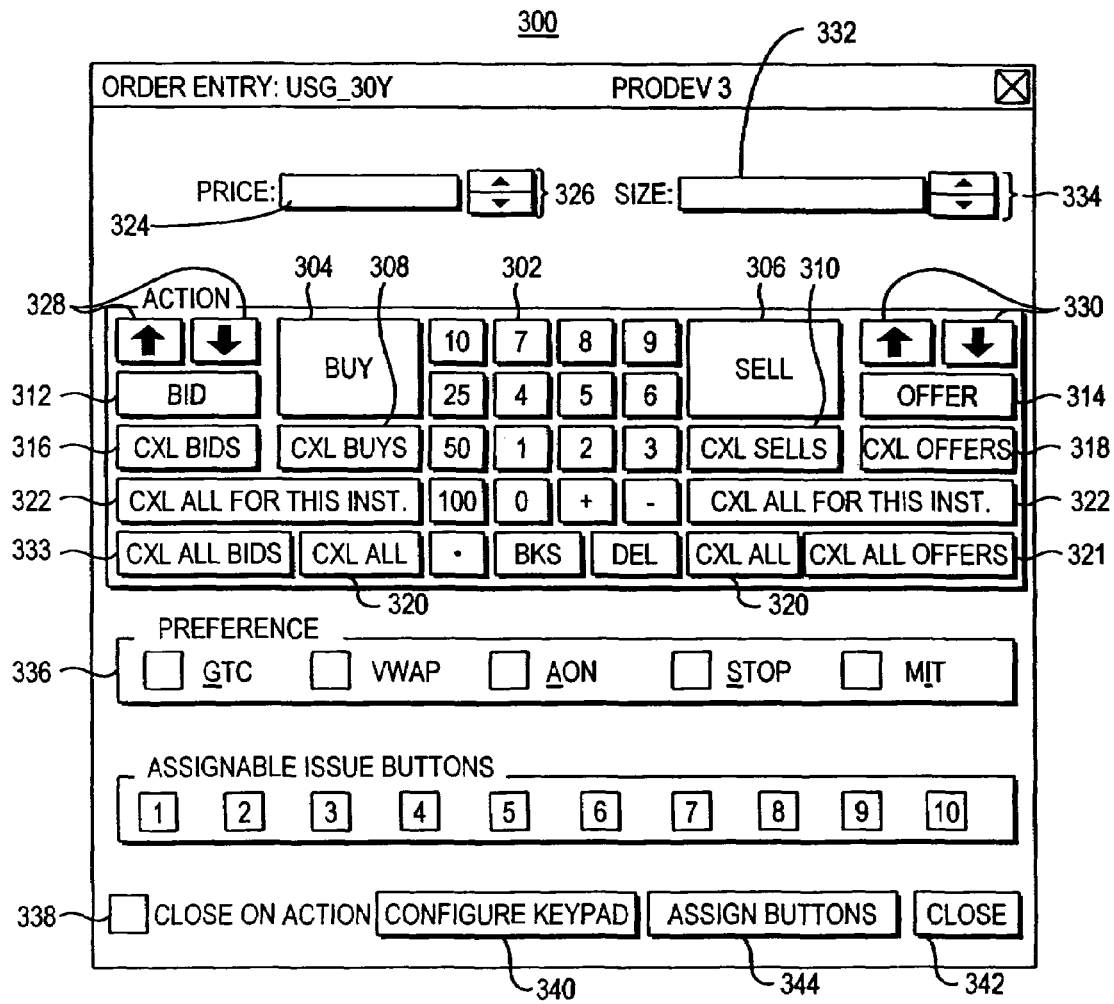
FIG. 3 is an illustration of an interactive dialog window that may be generated in accordance with certain embodiments of the present invention.
Figure 5:
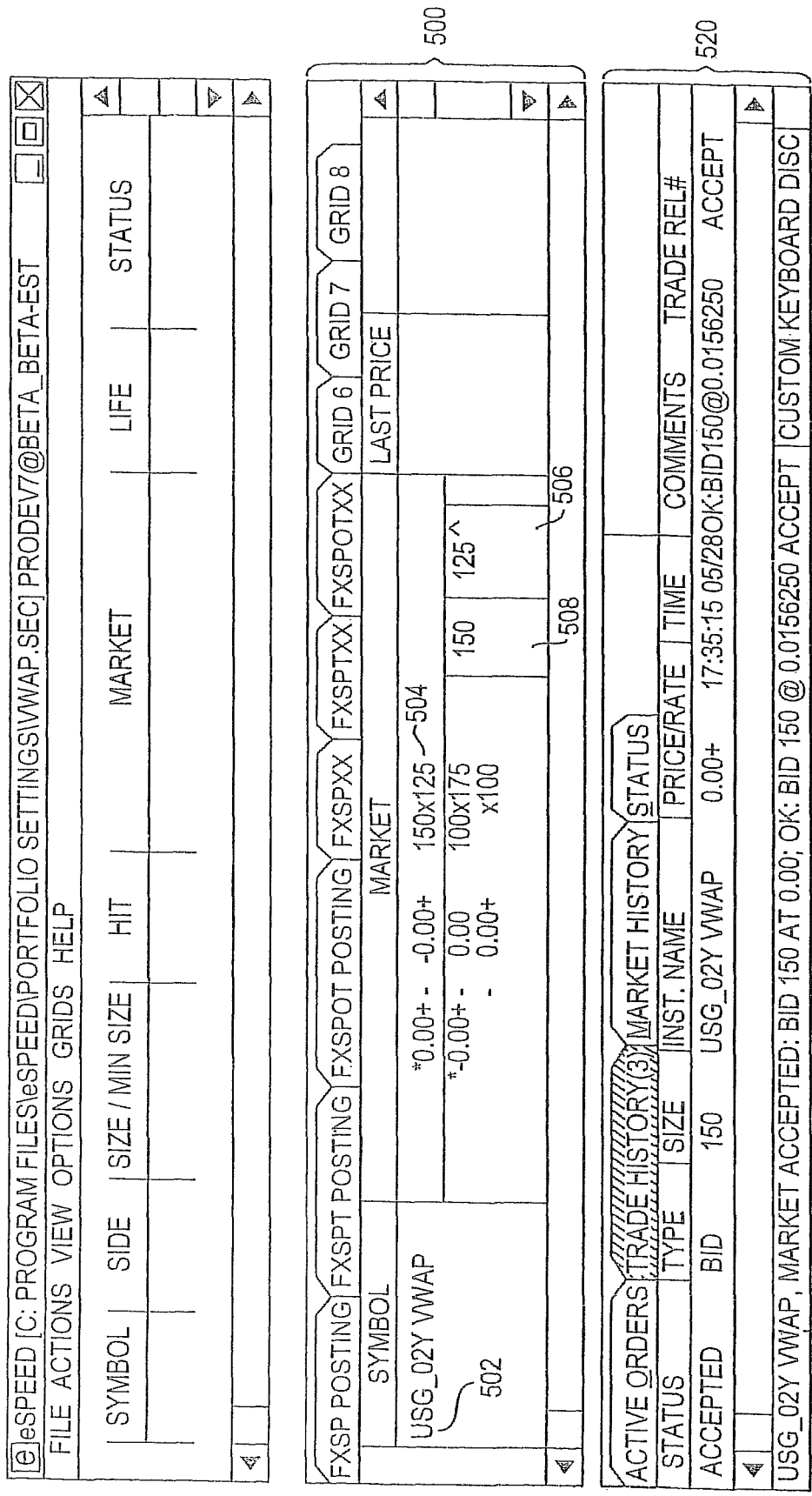
FIG. 5 is an illustration of a market cell that may be generated with certain embodiments of the present invention.

FIG. 3 illustrates one embodiment of a graphical interface for submitting trading commands using, for example, one of the workstations 102 as shown in FIGS. 1 and 2. As shown, the graphical interface comprises a dialog window 300 with various buttons and entry fields 302-344. Using these buttons and entry fields, a trader may submit a bid command, an offer command, a buy command, or a sell command for an item corresponding to a market cell. A market cell is illustrated in FIG. 5. Preferably, each traded item uses a unique dialog window 300. Dialog window 300 may be opened automatically and/or manually before, during, and/or after a trade, and may allow a trader to submit a trade command at any time. The dialog window 300 may be repositioned on a trader's display and/or fixed in place. The trader, preferably, will keep the window associated with a particular instrument below the market cell for the same tradable item. The number of dialog windows 300 that can be kept open at any one time is preferably unlimited.

As shown in FIG. 3, dialog window 300 may comprise a variety of on-screen buttons and entry fields. Generally, a button, as displayed in window 300, may be "pushed" by placing a pointing device's pointer over the button and pressing a switch on the pointing device, as is commonly known in the art. At the center of window 300, a numeric keypad 302 may be displayed. The numeric keypad 302 may provide buttons for numbers zero through nine and may contain buttons for numbers ten, twenty-five, fifty, and one hundred or any other appropriate or desirable values. The numeric keypad 302 may also contain a plus button ("+"), a minus button ("−"), a decimal point button ("."), a backspace button ("BKS"), and a delete button ("DEL").

In addition to displaying a numeric keypad as described above, dialog window 300 may also provide a trader with a buy button 304, a sell button 306, a cancel buys button 308, a cancel sells button 310, a bid button 312, an offer button 314, a cancel bid button 316, a cancel offer button 318, a cancel all button 320, a cancel all for this instrument button 322, a cancel all bids button 323, a cancel all offers buttons 321, a price entry field 324, price up and down buttons 326, bid price up and down buttons 328, offer price up and down buttons 330, a size entry field 332, and size up and down buttons 334. Finally, dialog window 300 may contain a preference field 336, a configure keypad button 340, a close button 342, and an assign buttons button 344. Close-on-action box 338 causes dialog window 300 to be automatically closed after specified actions are performed. Close button 342 closes the dialog window 300 on demand.

Configure keypad button 340 may allow a trader to arrange buttons appearing in dialog window 300 to be anywhere a trader prefers by first pressing the configure keypad button 340, by then dragging the buttons to new positions, and finally by clicking on button 340 again. Also, the configuration or re-configuration of buttons can change the function of those buttons depending on the type of trading desired or what type of item is being traded.

Preference field 336 allows a trader to specify preferred types of orders. Preference field 336 may be used to indicate the trader's preferred trade type and may allow the trader to select any type of trade that a particular exchange or trading system supports. Although FIG. 3 provides specific examples of trade types (e.g., good-till-canceled (GTC), volume-weighted average price (VWAP), all-or-none (AON), stop, and market-if-touched (MIT)), it will be appreciated that this invention may be implemented with any type of trade.

Figure 4:
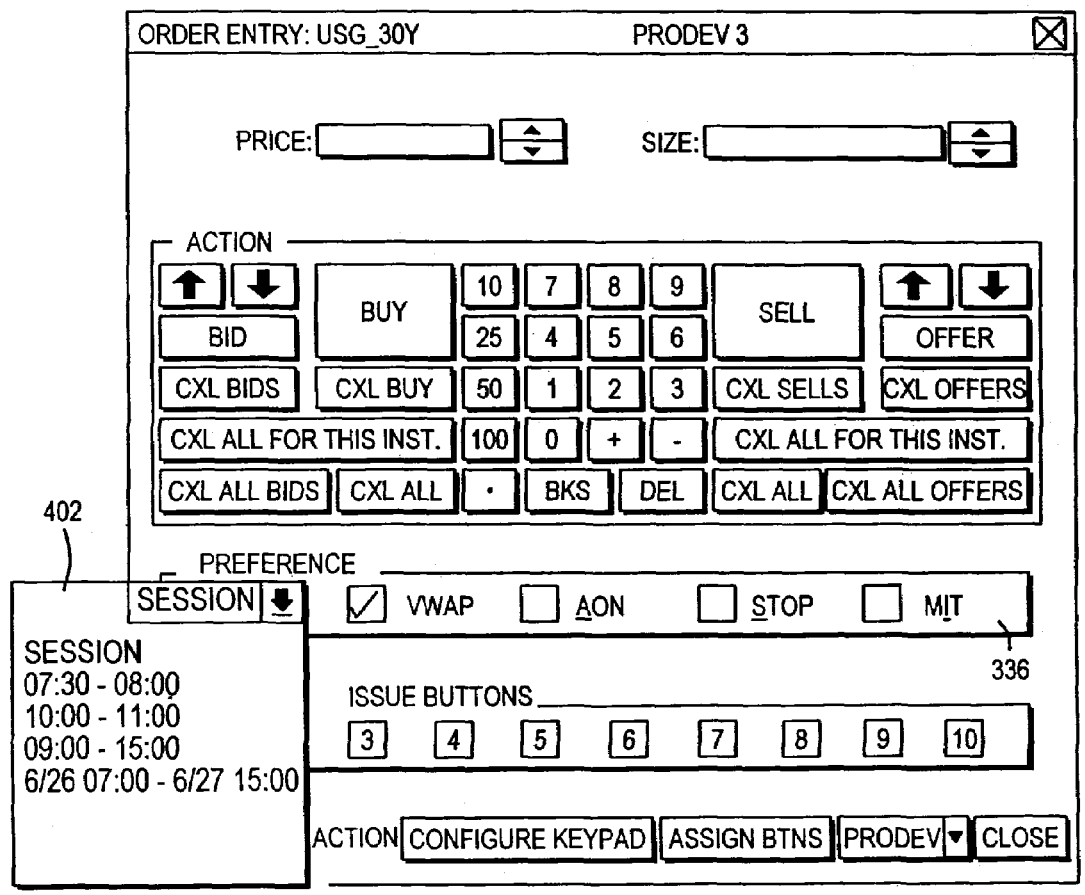
FIG. 4 is an illustration of another interactive dialog window that may be generated in accordance with certain embodiments of the present invention.

As shown in FIGS. 3 and 4, in response to a trader selecting to trade on the VWAP in preference field 336, a window 402 may appear that provides a trader with the ability to select an available VWAP auction. In this example, each available VWAP auction is listed by its corresponding VWAP auction period. As used herein, the VWAP auction period is the time period in which traders may enter VWAP bids or orders. As shown in FIG. 4, window 402 shows that there are four available VWAP auctions that the trader may enter. In this example, the VWAP auction session is identified by the VWAP auction open time and the VWAP auction close time. The trader may select one of the available VWAP sessions: 7:30-8:00, 10:00-11:00, 9:00-15:00, or 7:00 on June 26 to 15:00 on June 27.

It should be noted that multiple VWAP auctions may take place at the same time on the same item. For example, the electronic trading application may accept VWAP orders on the 5 year U.S. Treasury bond for every hour, where each VWAP auction period lasts two hours. In some embodiments, VWAP auction may surround an economic release.

Although FIGS. 3 and 4 show an example of how a user may enter a VWAP auction session by selecting a VWAP order type or attribute on an existing instrument, it should be obvious to those of ordinary skill in the art that the same features of the present invention are available for any instrument. VWAP orders may be submitted using a separate VWAP instrument. For example, a trader may bid on a separate VWAP item, such as "usg__30Y vwap 09:30-10:00." In this example, the VWAP item is designated as a VWAP contract name along with the corresponding VWAP auction session.

In yet another embodiment, a trading interface that may be configured to provide a requesting trader with an opportunity to submit and monitor a request for quote (RFQ). An RFQ may be constructed for any instrument in a particular market. In this example, VWAP orders may be submitted using this RFQ application, where the VWAP auction session is the length of the RFQ. Systems and methods for providing a trading interface with a request for quote (RFQ) functionality are also described, for example, in Gilbert et al. U.S. patent application Ser. No. 10/113,841, filed in Mar. 29, 2002, which is hereby incorporated by reference herein in its entirety.

In response to a trader selecting an available VWAP session, the trader may be prompted to enter an order. During the VWAP auction period, traders may enter bids—i.e., orders to buy at the VWAP price—and offers—i.e., orders to sell at the VWAP price. As shown in FIG. 4, the trader is prompted to enter a symbol name (e.g., usg__10Y VWAP) and a size. In some embodiments, a trader may also enter a spread to the calculated VWAP price. For example, the trader may be permitted to enter a bid or an offer at some increment to the calculated VWAP price.

FIG. 5 shows an illustrative display of a market cell 500 in which a trader has initiated trading in accordance with the principles of the present invention. Market cell 500 shows that the trader is participating in a market in which an item 502 (e.g., usg__02Y vwap) is being traded. Item 502 may be any suitable type of commodity, such as, for example, securities, bonds, coupons, etc. As shown in FIG. 5i a price indicating the current selling and/or buying price of item 502 is not displayed because the traders are bidding at the VWAP price. In this embodiment, orders include a size and a side (e.g., buy or sell). Item indicator 504 provides traders with an indication of the quantity of item 502 available in the market. If, for example, sellers are operating in the active side of the market, item indicator 504 informs the traders of the total number of items 502 that are available for sale in the market.

Market cell 500 also includes a seller stack 506 and a buyer stack 508. Seller stack 506 informs traders of the quantity of items 502 that a particular seller is offering to sell. Likewise, buyer stack 508 informs traders of the quantity of item 502 that a particular buyer is offering to buy. As shown in FIG. 5, seller stack 506 and buyer stack 508 shows that a seller is offering to sell 125 million 2 Year U.S. Treasury bonds at the VWAP price and a buyer is offering to buy 150 million 2 Year U.S. Treasury bonds at the VWAP price. Market cell 500 also includes a market spread indicator 510 that provides traders with information regarding the depth of the market (i.e., the price and quantity of items available in the market).

In response to a trader placing an order, a trade history window 520 may provide the trader with a confirmation and status information of the trader's orders. As shown in FIG. 5, the trader has placed a bid for 150 million 2 Year U.S. Treasury bonds at the VWAP price. Trade history window 520 provides the trader with a confirmation message 522. In this example, confirmation message 522 informs the trader that the trader's bid has been accepted.

When the VWAP auction session closes, no more bids or offers are accepted. After a predetermined time, the VWAP calculation period begins. As used herein, the VWAP calculation period is the period of time in which the size and price data of placed orders from one or more traders is collected. The collected data is processed to determine the VWAP price. In some embodiments, the VWAP calculation period occurs after the VWAP auction period. However, the VWAP calculation period may occur at any other suitable time. For example, the VWAP auction period and the VWAP calculation period may be concurrent, thereby creating arbitrage opportunities. For example, a trader may buy on the VWAP price during a first VWAP period for immediate resale during another VWAP period in order to profit from a price discrepancy.

Figure 6:
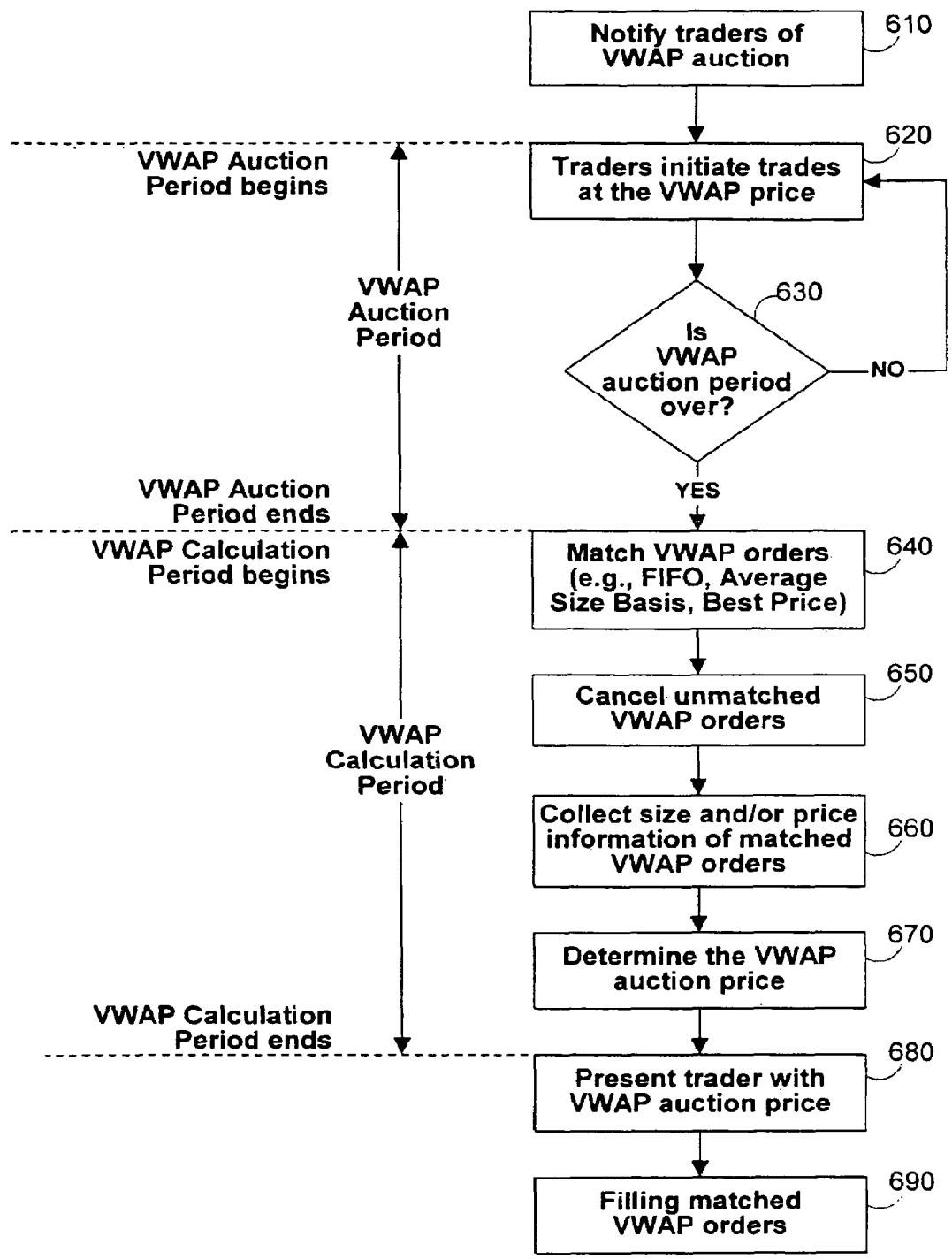
FIG. 6 is a flow diagram of a main process that may be used to provide a volume-weight average price auction with certain embodiments of the present invention.

One embodiment of a VWAP trading process that may be used to provide VWAP auctions in accordance with the principles of the present invention is illustrated in FIG. 6. In practice, one or more of the steps shown may be combined with other steps, performed in any suitable order, or deleted. At step 610, the electronic trading application may notify traders of an upcoming VWAP auction. For example, traders may be invited to participate in an upcoming VWAP auction by entering bids and/or offers during a VWAP auction period. Traders may also be provided with session reminders. In some embodiments, the electronic trading application may communicate a reminder to a trader, such as "VWAP session 7:30 am-8:30 am begins in 2 minutes" or "VWAP session 7:30 am-8:30 am closes in 1 minute."

At step 620, a trader may initiate a trade at the VWAP price (e.g., place an offer to sell or buy an item). As shown in FIGS. 3 and 4, the trader may select from a list of available VWAP auction sessions. In response to selecting an available VWAP auction session, the trader has a predetermined amount of time to place bids and/or offers. As shown in FIG. 4, the trader is prompted to enter a symbol name (e.g., usg__10Y VWAP) and a size. In some embodiments, a trader may also enter a spread to the calculated VWAP price. For example, the trader may be permitted to enter a bid or an offer at some increment to the calculated VWAP price.

In some embodiments, traders may be permitted to place orders that are improvements to the VWAP price. For example, a buyer may enable price improvement to enter an improved price (e.g., a fraction or increment) higher than the current price to make the bid more aggressive. For example, if a current selling price is 106.06, a trader may enter an order such that a price improvement of 106.056 is obtained. Entering a more aggressive bid may also move the buyer to the top of the stack. As used herein, an improved price is a price that is better than the touch price—i.e., a price at which a trader initiated trading for a particular item. A better price, however, is dependent on whether the trader is a buyer or a seller. If the trader is a buyer, then a better (i.e., more aggressive) price is higher than the touch price. If the trader is a seller, then a better price is lower than the touch price. Persons skilled in the art will also appreciate that "improved prices" can be dependent on a particular type of market. For example, in a yield market, a seller's action may be improved by submitting a price higher than the touch price.

In some embodiments, a trader may set a price improvement level of "BEST" using dialog window 300 or dialog window 400 as shown in FIGS. 3 and 4. The "BEST" price improvement setting (not shown) may allow a trader to automatically jump in front of other traders in the stack. The "BEST" price improvement setting increases the order price at any suitable increment (e.g., 0.25, 0.50, 0.75, etc.) that is more aggressive than the price currently at the top of the stack.

Systems and methods for providing price improvement in an active trading market are also described, for example, in co-pending, commonly-assigned Sweeting U.S. patent application Ser. No. 10/171,009, filed Jun. 11, 2002, which is hereby incorporated by reference herein in its entirety.

At step 630, once the electronic trading application has determined that the VWAP auction period has ended, the electronic trading application matches the VWAP orders. In some embodiments, VWAP orders may be matched on a first-in-first-out (FIFO) basis.

In another suitable approach, VWAP orders may be matched on an average size basis—i.e., orders are filled based upon a percentage of the size of the order in relationship to the lesser of the sum of the bid sizes or the sum of the ask sizes. For example, a first trader may place an order to buy 200 million 30 Year U.S. Treasury bonds, a second trader and a third trader may each place an order to buy 100 million 30 Year U.S. Treasury bonds, and a fourth trader may place an order to sell 150 million 30 Year U.S. Treasury bonds. In this example, the first trader has placed an order that is fifty percent of the total offers to buy. After the VWAP price is calculated, the first trader receives fifty percent of the 150 million bonds that the fourth trader is willing to sell or 75 million bonds. The second and third traders each receive twenty-five percent of the 150 million bonds or 37.5 million bonds. However, it should be noted that a trader may set the VWAP order as an all-or-none (AON) VWAP order such that either the entire VWAP order is filled or the entire VWAP order is cancelled.

In another suitable approach, the electronic trading application may prioritize the stack first by best price and then by time of order in order to match VWAP orders. However, the electronic trading application may match and/or prioritize VWAP orders using any other suitable approach.

In response to matching the VWAP orders, the electronic trading application cancels the VWAP orders that are not matched at step 650. In some embodiments, VWAP orders that are not matched may be rolled over to another VWAP session on the same item. In other embodiments, a trader may place a recurring VWAP order such that the VWAP order is placed each day for a specific VWAP auction session. For example, a trader may enter an order to buy 150 million 2 Year U.S. Treasury bonds at the VWAP price each day for a particular VWAP auction session until the VWAP order is filled. In some embodiments, the recurring VWAP order may be placed every day until the trader cancels the recurring order.

In response to matching VWAP orders (at step 640) and canceling the unmatched VWAP orders (at step 650), the electronic trading application may collect size and price (if available) information of the received orders. The electronic trading application processes the collected size and price information to determine the VWAP auction price. As described previously, the VWAP auction price is determined using the following algorithm:

$$VWAP = \frac{\sum (\text{Traded Price})(\text{Total Size at that Price})}{\sum \text{Total Size of Trade during Designated Trading Period}}$$

At step 680, the electronic trading application presents the traders of the VWAP auction session with the determined VWAP auction price. In response to determining the VWAP price, the electronic trading application fills the matched VWAP orders. In some embodiments, the electronic trading application may physically deliver the matched VWAP order. For example, suppose a trader buys 100 million 30 Year U.S. Treasury bonds at the VWAP price and the determined VWAP price is 100 with an accrued interest equaling $2,000,000. The current 30 Year U.S. Treasury bonds may be delivered as opposed to a payment of $102,000,000.

In another suitable embodiment, the electronic trading application may financially deliver the matched VWAP order. That is, financial delivery may not require the exchange of securities, but rather it requires the exchange of some money based upon the settlement value of the VWAP security. For example, suppose a trader buys $100 million 30 Year U.S. Treasury bonds at the VWAP price and the determined VWAP price is 100 with an accrued interest equaling $2,000,000. The closing market price at the time of the closing VWAP calculation period is $101,000,000. The trader receives the $1,000,000 directly from the seller of the bonds.

Thus, systems and methods for providing volume-weighted average price trading are provided. Persons skilled in the art will appreciate that the present invention can be practiced by other than the described embodiments, which are presented for purposes of illustration and not of limitation, and that the present invention is limited only by the claims which follow.

What is claimed is:

1. A method comprising:
   receiving by a server as part of an auction a plurality of orders for an item from a plurality of traders,
      wherein each order comprises a side, a price, and a size and wherein the auction has an auction close time,
      wherein as part of the auction matched orders are filled based at least in part on a VWAP price that is determined as part of the auction,
      wherein at least one of the plurality of VWAP orders comprises a bid to buy the item at the VWAP price offset by a price increment, and
      wherein at least another of the plurality of VWAP orders comprises an offer to sell the item at the VWAP price offset by the price increment;
   prioritizing by the server the plurality of orders from the plurality of traders based on predetermined criteria after the auction close time;

matching by the server the plurality of orders from the plurality of traders based at least in part on the prioritization of the plurality of orders,
  wherein a portion of the plurality of orders is matched and a portion of the plurality of orders is unmatched, and
  wherein matching the plurality of orders includes matching the bid with the offer at a price that includes the VWAP price offset by the price increment;
canceling by the server the portion of the plurality of orders that are unmatched; and
determining by the server the VWAP price based at least in part on (i) a plurality of trade prices and trade sizes for the item, and (ii) the sizes and the prices at which the plurality of orders are matched,
  wherein external orders comprise the trade prices and the trade sizes, and wherein the external orders are not the plurality of orders; and
wherein the portion of the plurality of orders that are matched are filled based at least in part on the determined VWAP price.

2. The method of claim 1 further comprising distributing a notification to the plurality of traders regarding the auction.

3. The method of claim 1 wherein the predetermined criteria enables the prioritizing to be performed based on a time that each order was received.

4. The method of claim 1 wherein the predetermined criteria enables the prioritizing to be performed based on an average size of the plurality of orders.

5. The method of claim 1 wherein the predetermined criteria enables the prioritizing to be performed based on the price of each order received.

6. The method of claim 1 further comprising rolling over the portion of the plurality of orders that are not matched to a second auction.

7. The method of claim 1 further comprising receiving a recurring order from a trader such that the order is continuously placed in additional auctions until the trader cancels the recurring order.

8. The method of claim 1 further comprising receiving a recurring order from a trader such that the order is continuously placed in additional auctions until the order is filled.

9. The method of claim 1 further comprising physically delivering the portion of the plurality of orders that are matched.

10. The method of claim 1 further comprising financially delivering the portion of the plurality of orders that are matched.

11. The method of claim 1 wherein receiving a plurality of orders for the auction further comprises receiving at least one price-improved order having a price and a size.

12. The method of claim 1 further comprising providing a notification when the portion of the plurality of orders that are matched have been filled.

13. An apparatus comprising:
  at least one processor; and
  a memory electronically coupled to the at least one processor, wherein the memory stores a program which, when executed by the at least one processor, directs the at least one processor to:
  receive as part of an auction a plurality of orders for an item from a plurality of traders,
    wherein each order comprises a side, a price, and a size and wherein the auction has an auction close time,
    wherein as part of the auction matched orders are filled based at least in part on a VWAP price that is determined as part of the auction,
    wherein at least one of the plurality of VWAP orders comprises a bid to buy the item at the VWAP price offset by a price increment, and
    wherein at least another of the plurality of VWAP orders comprises an offer to sell the item at the VWAP price offset by the price increment;
  prioritize the plurality of orders from the plurality of traders based on predetermined criteria after the auction close time;
  match the plurality of orders from the plurality of traders based at least in part on the prioritization of the plurality of orders,
    wherein a portion of the plurality of orders is matched and a portion of the plurality of orders is unmatched, and
    wherein matching the plurality of orders includes matching the bid with the offer at a price that includes the VWAP price offset by the price increment;
  cancel the portion of the plurality of orders that are unmatched; and
  determine the VWAP price based at least in part on (i) a plurality of trade prices and trade sizes for the item, and (ii) the sizes and the prices at which the plurality of orders are matched,
    wherein external orders comprise the trade prices and the trade sizes, and wherein the external orders are not the plurality of orders; and
  wherein the portion of the plurality of matched orders are filled based at least in part on the determined VWAP price.

14. The apparatus of claim 13 wherein the program, when executed by the at least one processor further directs the at least one processor to distribute a notification to the plurality of traders regarding the auction.

15. The apparatus of claim 13 wherein the predetermined criteria enables the prioritizing to be performed based on a time that each order was received.

16. The apparatus of claim 13 wherein the predetermined criteria enables the prioritizing to be performed based on an average size of the plurality of orders.

17. The apparatus of claim 13 further comprising rolling over the portion of the plurality of orders that are not matched to a second auction.

18. The apparatus of claim 13 wherein the predetermined criteria enables the prioritizing to be performed based on the price of each order received.

19. The apparatus of claim 13 wherein the program, when executed by the at least one processor further directs the at least one processor to receive a recurring order from a trader such that the order is continuously placed in additional auctions until the order is filled.

20. The apparatus of claim 13 wherein receiving a plurality of orders for the auction further comprises receiving at least one price-improved order having a price and a size.

* * * * *